United States Patent [19]

Bennett et al.

[11] 4,152,369

[45] May 1, 1979

[54] METHOD FOR PREPARING COMPOSITIONS OF A POLYPHENYLENE ETHER RESIN AND AN ALKENYL AROMATIC ADDITION POLYMER USING AN ALKENYL AROMATIC MONOMER AS THE SOLVENT

[75] Inventors: James G. Bennett, Menands; Glenn D. Cooper; Arthur Katchman, both of Delmar, all of N.Y.

[73] Assignee: General Electric Company, Pittsfield, Mass.

[21] Appl. No.: 401,987

[22] Filed: Oct. 1, 1973

[51] Int. Cl.$^2$ .............................................. G08L 23/00
[52] U.S. Cl. ..................................................... 260/874
[58] Field of Search ......................................... 260/874

[56] References Cited

U.S. PATENT DOCUMENTS 3,700,750  10/1972  Yamanouchi et al. ............... 260/874

FOREIGN PATENT DOCUMENTS 2126434  12/1971  Fed. Rep. of Germany ........... 260/874

*Primary Examiner*—Richard B. Turer
*Attorney, Agent, or Firm*—Morgan, Finnegan, Pine, Foley & Lee

[57] ABSTRACT

A novel process is provided for preparing a blend of a polyphenylene ether resin and an alkenyl aromatic addition polymer which comprises using an alkenyl aromatic monomer as a solvent for the oxidative coupling of a phenol to form a polyphenylene ether resin and thereafter polymerizing the alkenyl aromatic monomer to form said blend of alkenyl aromatic addition polymer and a polyphenylene ether resin.

11 Claims, No Drawings

METHOD FOR PREPARING COMPOSITIONS OF A POLYPHENYLENE ETHER RESIN AND AN ALKENYL AROMATIC ADDITION POLYMER USING AN ALKENYL AROMATIC MONOMER AS THE SOLVENT

This invention relates to a novel process for preparing blends of a polyphenylene ether resin and an alkenyl aromatic addition polymer. The process is based on the use of the monomeric alkenyl aromatic compound as a solvent for the oxidative coupling of a phenol. Thereafter, the blend is formed by polymerizing the alkenyl aromatic monomer in the presence of the polyphenylene ether resin.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes using metal-amine catalyst are found in Bussink et al, U.S. Pat. Nos. 3,337,499; Blanchard et al., 3,219,626; Laakso et al., 3,342,892; Borman, 3,344,116; Hori et al, 3,384,619; Faurote et al., 3,440,217; and disclosures relating to metal based catalysts which do not include amines, are known from patents such as Wieden et al, U.S. Pat. Nos. 3,442,885 (copper-amidines); Nakashio et al., 3,573,257 (metal-alcoholate or -phenolate); Kobayashi et al., 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc. are described in Price et al, U.S. Pat. No. 3,382,212. All of the above-mentioned disclosures are incorporated herein by reference.

The term "alkenyl aromatic addition polymer" includes polymers and copolymers of alkenyl aromatic monomers such as styrene, alpha methyl styrene, chlorostyrene, ethylvinylbenzene, divinylbenzene, vinylnaphthalene and the like.

Most of the prior art processes for preparing compositions of alkenyl aromatic addition polymers and polyphenylene ether resins have been based on powder blending followed by several extrusions to form the alloyed material which is suitable for the injection molding of useful articles. The prior art has also employed solution blending techniques to form powder compositions suitable for extrusion blending. This procedure is carried out by first dissolving the components in a suitable solvent and thereafter adding a non-solvent to cause precipitation of both components. The polymeric components are prepared separately and are obtained in substantially pure form by various separation techniques and are thereafter dissolved in an appropriate solvent.

Such procedures have disadvantages, including a high energy cost, the need to use complex equipment, a loss in yield due the number of handling steps required, loss of economy through solvent and non-solvent evaporation and intermingling, and difficulty in controlling particle size distribution in the product.

It has now been discovered that resinous compositions of a polyphenylene ether resin component and an alkenyl aromatic addition polymer can be obtained by first polymerizing the polyphenylene ether resin in the alkenyl aromatic monomer. Thereafter, the alkenyl aromatic monomer is polymerized in the presence of the polyphenylene ether resin to form the composition.

An advantage of this process resides in the fact that these compositions may be injection molded after a single pass through an extruder. It is especially advantageous when compositions are prepared which have a high content of alkenyl aromatic addition polymers. Lower extrusion temperatures or increased extrusion rates are made possible when high proportions of alkenyl aromatic addition polymers are used.

The advantages over conventional antisolvent precipitation or solution blending are:

(i) the cost of the antisolvent and of recovering the antisolvent from the filtrate is eliminated;

(ii) the cost of independently isolating the alkenyl aromatic addition polymer from its reaction solvent is eliminated;

(iii) the cost of independently isolating the polyphenylene ether resin from its reaction mixture is eliminated;

(iv) no solvent separation procedure is required to directly obtain a blend composition of the alkenyl aromatic addition polymer and polyphenylene ether resin.

A surprising and unexpected result from the process of the present invention is the substantially complete elimination of colored impurities produced in the oxidation of the phenolic monomer. The reactions causing the colored impurities which are usually dark-reddish brown are not known, but it has been found that the subsequent bulk or suspension polymerization of the alkenyl aromatic monomer results in a colorless blend. This type of blend is particularly desirable for formulating white or pastel-colored molding powders. It has also been found that the subsequent bulk polymerization of the alkenyl aromatic monomer with e.g., a peroxide catalyst will result in the formation of graft copolymers of polyphenylene ether-alkenyl aromatic addition polymer.

DESCRIPTION OF THE INVENTION

According to the present invention, there is provided a process for making a composition comprising from 1 to 99 parts by weight of an alkenyl aromatic addition polymer component and from 99 to 1 parts by weight of a polyphenylene ether resin component, said process comprising;

(a) providing a first mixture of a phenol, capable of oxidatively coupling to form said polyphenylene ether resin component, a catalytic amount of a catalyst capable of oxidatively coupling said phenol and an alkenyl aromatic monomer capable of forming an addition polymer;

(b) polymerizing said phenol in said first mixture in the presence of oxygen and said catalyst to produce a second mixture of said polyphenylene ether and said alkenyl aromatic monomer; and (c) polymerizing said alkenyl aromatic monomer in said second mixture to form said composition of an alkenyl aromatic addition polymer and a polyphenylene ether resin.

The phenol capable of oxidatively coupling to form said polyphenylene ether resin component is selected from compounds of the formula

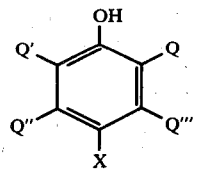

wherein X is selected from the group consisting of hydrogen, chlorine, bromine and iodine, Q is selected from the group consisting of hydrogen, hydrocarbon radicals, halohydrocarbon radicals having at least two carbon atoms between the halogen atom and the phenol nucleus, hydrocarbonoxy radicals having at least two carbon atoms between the halogen atom and the phenol nucleus, Q' and Q" are the same as Q and in addition, halogen with the proviso that Q, Q' and Q" are all free of a tertiary carbon atom.

The alkenyl aromatic monomer may be selected from those compounds having the formula

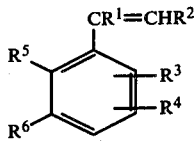

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom.

Specific examples of alkenyl aromatic monomers include styrene, chlorostyrene, alpha-methylstyrene, vinyl xylene, divinylbenzene and vinyl naphthalene.

The specific materials required for the practice of the invention are well known and are commercially available.

The catalysts employed for the oxidative coupling of the phenolic compound are described in the literature, the above referenced Hay and Stamatoff patents, or in U.S. Pat. No. 3,400,100. Generally, the oxidative coupling may be carried out using the alkenyl aromatic monomer as a solvent in place of those solvents such as benzene, toluene, xylene, etc. which have been used in the prior art. The catalyst may be left in the reaction mixture and the alkenyl aromatic monomer may be polymerized in the presence thereof. If desired, the oxidative coupling catalyst may be separated from the polyphenylene ether resin and the alkenyl aromatic monomer prior to polymerizing said alkenyl aromatic monomer to form the composition of the polyphenylene ether resin and the alkenyl aromatic polymer. The use of an effective amount of a non-catalytic oxidizing agent is also included within the scope of this invention.

After the polyphenylene ether resin is formed, the alkenyl aromatic monomer may be polymerized by any suitable method, such as by bulk, emulsion or suspension polymerization. The bulk polymerization may be carried out thermally or with a free-radical catalyst, such as benzoyl peroxide; lauroyl peroxide; octanoyl peroxide; 2,4-dichlorobenzoyl peroxide; 1,1-di-t-butyl peroxy-3,5,5-trimethyl cyclohexane and the like. Procedures for polystyrene polymerization are found in Preparative Methods of Polymer Chemistry, 2nd Ed., W. R. Sorenson & T. W. Campbell, Interscience Pub. (1968) which is hereby incorporated by reference. Pages 216–220 are of particular interest.

The subsequent bulk polymerization of the alkenyl aromatic monomer results in the formation of compositions which include graft copolymers of the polyphenylene ether with the alkenyl aromatic addition polymer.

The polymerization of the alkenyl aromatic monomer may be carried essentially to completion, in which case the composition of the final product is determined by the concentration of the phenol in the first-reaction mixture. When the process of the invention is employed to produce compositions having relatively high concentrations of a polyphenylene ether resin, i.e. over about 25% by weight, this can be done by separating a portion of the alkenyl aromatic monomer, e.g. by distillation from the polyphenylene ether resin prior to polymerizing said alkenyl aromatic monomer. In an alternate procedure, the polymerization of the alkenyl aromatic monomer may be terminated prior to completion and the unreacted styrene monomer may be recovered leaving a blend having the desired proportions of the respective components. The preferred composition will have from 10–80% of alkenyl aromatic polymer.

If desired, the blends obtained by process of this invention may be formulated into various flame-retardant, stabilized compositions according to techniques well known in the art.

DESCRIPTION OF THE PREFERRED EMBODIMENTS

The process of the present invention is further illustrated in the following examples which are set forth as further descriptions of the invention, but are not to be construed as limiting the invention thereto.

EXAMPLE 1

Styrene monomer, stabilized with tert-butyl catechol, was washed once with 10% sodium hydroxide solution, then with water, and dried over anhydrous magnesium sulfate. 50 ml of the styrene was placed in a large open tube with 0.144 g of cuprous bromide and 1.7 ml of di-n-butyl amine. The mixture was stirred vigorously at 30° C. while a stream of oxygen was introduced near the bottom of the tube and a solution of 10 g of 2,6-xylenol in 50 ml of styrene was added over a period of 10 minutes. After two hours, the reaction was terminated by the addition of 50% aqueous acetic acid. The mixture was centrifuged and the upper phase containing polyphenylene ether in styrene solution was decanted. A small portion of the solution was added to methanol and the precipitated polymer was filtered off and dried. Infrared analysis showed that it contained polyphenylene ether, with polystyrene.

A mixture of 16 g of the decanted reaction mixture obtained as described above, 40 g of water, 0.02 g of potassium persulfate, 0.02 g of sodium dihydrogen phosphate and 0.4 g of sodium lauryl sulfate was stirred vigorously at 70° C. under a nitrogen blanket for one hour. Vacuum was applied for ten minutes to remove some of the excess styrene, and a portion of the mixture was added to methanol. The polymer was filtered off, washed several times with water and with methanol. Analysis showed that it contained polyphenylene ether, and polystyrene.

EXAMPLE 2

A 12.0 g portion of the decanted reaction mixture obtained by the oxidation of 2,6-xylenol in styrene as described in Example 1, was placed in a small flask, the system was purged with nitrogen, 0.05 g of azo-bis-isobutyronitrile was added, and the mixture was heated for three hours at 60° C. The polymer was precipitated with methanol and analysis showed that it contained polyphenylene ether and polystyrene.

EXAMPLE 3

A portion of the decanted reaction mixture, obtained by the oxidation of 2,6-xylenol in styrene as described in Example 1, was placed in a pressure bottle under nitrogen and heated for 24 hours at 100° C. The viscous mixture was added slowly to methanol with vigorous stirring. Analysis of the precipitated polymer showed 35% polyphenylene ether, 67% polystyrene. The intense yellow-orange color of the crude polyphenylene ether-styrene solution gradually disappeared during the polymerization and the precipitated product was colorless.

EXAMPLE 4

20 g of xylenol was dissolved in 180 g of styrene, which had been washed once with 10% sodium hydroxide, then with water, and dried over anhydrous magnesium sulfate. 0.5 g of dodecyltrimethylammonium chloride was added, then 90 g of lead oxide was added in small portions over a period of five minutes with vigorous stirring. The temperature of the reaction mixture increased to 60° C. It was cooled to 40° C., and filtered. A portion of the filtrate was distilled under vacuum to remove some of the unreacted styrene and 3.5 g of the distilled solution was added to methanol, yielding 0.79 g of polymer (97% polyphenylene ether, 3% polystyrene).

EXAMPLE 5

18.5 g of the distilled reaction mixture prepared in Example 4 (22% polyphenylene ether in styrene) was placed in a small flask with 50 ml of water, 0.01 g of sodium lauryl sulfate, 0.15 g of the sodium salt of poly (acrylic acid), 0.15 g of stearic acid, and 0.07 g of benzoyl peroxide and stirred vigorously under nitrogen at 80° C. The intense color of the original reaction mixture disappeared as reaction proceeded. After 24 hours the colorless polymer was filtered off, washed with water and methanol, and dried under vacuum. The weight of dried polymer was 18.2 g. Analysis showed that it contained 20% polyphenylene ether, 80% polystyrene.

EXAMPLE 6

0.81 g of cuprous bromide was stirred for 10 minutes with 4 ml of methanol and 10.9 g of di-n-butylamine in 50 ml of styrene to form a catalyst solution. The catalyst solution was transferred to a one liter stirred reactor with 400 ml of styrene. The mixture was vigorously stirred and oxygen was introduced near the bottom of the vessel at a rate of 0.25 cu. ft./hr. A solution of 70 g of 2,6-xylenol in 82 ml of styrene was added over a period of 15 minutes; the temperature was maintained at 30° C. by circulating water from a constant temperature bath through a cooling coil immersed in the reaction vessel. Two hours after the start of the reaction, 50 ml of 50% aqueous acetic acid was added and stirring was continued for five minutes. The mixture was centrifuged and the upper phase consisting of a solution of polyphenylene oxide in styrene, was decanted from the aqueous phase containing the polymerization catalyst. 223 g of this solution of the polyphenylene ether in styrene was distilled under vacuum until the weight of the solution remaining in the distillation flask was reduced to 80 g. 1.6 g of this concentrated solution is diluted with toluene and then added to methanol and 0.56 g of product (35 wt %) was recovered. 6.5 g of the concentrated polymer solution prepared above was heated under nitrogen for four days at 120° C. The polymer was precipitated by addition of methanol. The weight of the dried polymer was 2.89 g; its composition, determined by infrared analysis, was 73% polyphenylene ether, 28% polystyrene.

EXAMPLE 7

11.1 g of the concentrated polymer solution prepared in Example 6 was placed in a pressure bottle under nitrogen, with 0.2 g of dicumyl peroxide. The mixture was heated for four days at 120° C. Methanol was added and the polymer was filtered off; yield 10.1 g; composition (by infrared analysis), 53% polyphenylene ether, 47% polystyrene. 1.006 g of this composition was dissolved in 35 ml of hot methylene chloride and the solution was cooled in an ice bath, with gentle stirring, for two hours, then stirred for 30 minutes at room temperature and filtered under slight vacuum. The precipitate was washed with a small amount of cold methylene chloride, and then heated at 60° C. for 24 hours under vacuum to remove methylene chloride. The filtrate was evaporated to dryness and the polymer film also dried under vacuum. The fraction precipitating from methylene chloride weighed 0.555 g and was 85% polyphenylene ether, 13% polystyrene; the fraction remaining in solution weighted 0.4090 g and was 20% polyphenylene ether and 80% polystyrene. The presence of substantial amount of polyphenylene ether in the soluble fraction and of polystyrene in the precipitated complex demonstrates the presence of polyphenylene ether-polystyrene graft copolymer.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:
1. A process for preparing a composition comprising:
   (1) from 1 to 99 parts by weight of an alkenyl aromatic addition polymer component and
   (2) from 99 to 1 parts by weight of a polyphenylene ether resin component, said process comprising:
      (a) providing a mixture which consists essentially of from 99 to 1 parts by weight of a phenol capable of oxidatively coupling to form said polyphenylene ether resin component and from 1 to 99 parts by weight of an alkenyl aromatic monomer capable of forming an addition polymer;
      (b) polymerizing said phenol in said mixture in the presence of oxygen to produce a mixture of said polyphenylene ether resin and said alkenyl aromatic monomer; and (c) polymerizing said alkenyl aromatic monomer in said mixture to form said composition of an alkenyl aromatic addition polymer and a polyphenylene ether resin.

2. A process as defined in claim 1 wherein said phenol capable of oxidatively coupling to form said polyphenylene ether resin component (2) is selected from compounds of the formula

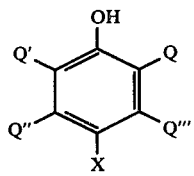

wherein X is selected from the group consisting of hydrogen, chlorine, bromine and iodine, Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, Q' and Q" are the same as Q and in addition, halogen with the proviso that Q, Q' and Q" are all free of a tertiary alpha-carbon atom.

3. A process as defined in claim 1 wherein said alkenyl aromatic compound is selected from the group consisting of styrene, alpha-methylstyrene, vinyl xylene, chlorostyrene, divinylbenzene and vinyl naphthalene.

4. A process as defined in claim 1 wherein a catalytic amount of a catalyst for the oxidative coupling of said phenol or an effective amount of an oxidizing agent for the oxidative coupling of said phenol is employed.

5. A process as defined in claim 4 wherein the residue of the oxidizing agent or the catalyst employed to effect oxidative coupling of the phenol is removed prior to initiating polymerization of the alkenyl aromatic compound.

6. A process as defined in claim 4 wherein said catalyst capable of oxidatively coupling said phenol is a copper-amine catalyst.

7. A process as defined in claim 1 wherein the alkenyl aromatic compound is polymerized in a bulk process to form a composition which includes graft copolymers of the polyphenylene ether resin and the alkenyl aromatic addition polymer.

8. A process as defined in claim 1 wherein the alkenyl aromatic compound is polymerized in an emulsion polymerization process.

9. A process as defined in claim 1 wherein the alkenyl aromatic compound is polymerized in a suspension polymerization process.

10. A process as defined in claim 1 wherein after the phenol is oxidatively coupled, a portion of the alkenyl aromatic monomer is separated from said mixture in order to increase the relative proportion of the polyphenylene ether resin in the composition.

11. A process as defined in claim 1 wherein the polymerization of the alkenyl aromatic monomer is terminated prior to completion and unreacted alkenyl aromatic monomer is separated in order to increase the relative proportion of the polyphenylene ether resin in the composition.

* * * * *

UNITED STATES PATENT OFFICE
CERTIFICATE OF CORRECTION

Patent No. 4,152,369  Dated May 1, 1979

Inventor(s) James G. Bennett et al

It is certified that error appears in the above-identified patent and that said Letters Patent are hereby corrected as shown below:

In Col. 3, lines 6-12, the structural formula should correctly read as follows:

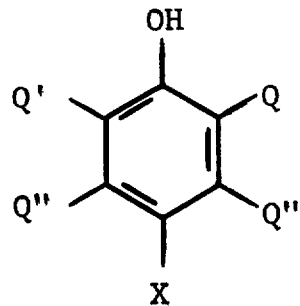

UNITED STATES PATENT OFFICE

CERTIFICATE OF CORRECTION

Patent No. 4,152,369　　　　　　　Dated　May 1, 1979

Inventor(s)　James G. Bennett et al

It is certified that error appears in the above-identified patent and that said Letters Patent are hereby corrected as shown below:

In Col. 7, lines 12-18, the structural formula should correctly read as follows:

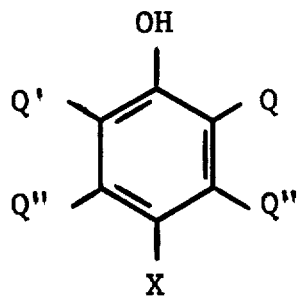

Signed and Sealed this

Twenty-second Day of July 1980

[SEAL]

Attest:

SIDNEY A. DIAMOND

Attesting Officer　　Commissioner of Patents and Trademarks